J. A. Hamer,
Pug Mill,
Nº 19,194.    Patented Jan. 26, 1858.

UNITED STATES PATENT OFFICE.

JAMES A. HAMER, OF READING, PENNSYLVANIA.

PUG-MILL.

Specification of Letters Patent No. 19,194, dated January 26, 1858.

*To all whom it may concern:*

Be it known that I, JAMES A. HAMER, of the city of Reading, county of Berks, and State of Pennsylvania, have invented a new and Improved Apparatus for Tempering and Carrying Clay into Brick-Machines; and I do hereby declare that the following is a full and exact description thereof, reference being had to the accompanying drawings, making a part of this specification, and to the letters of reference marked thereon, in which—

Figure 1:
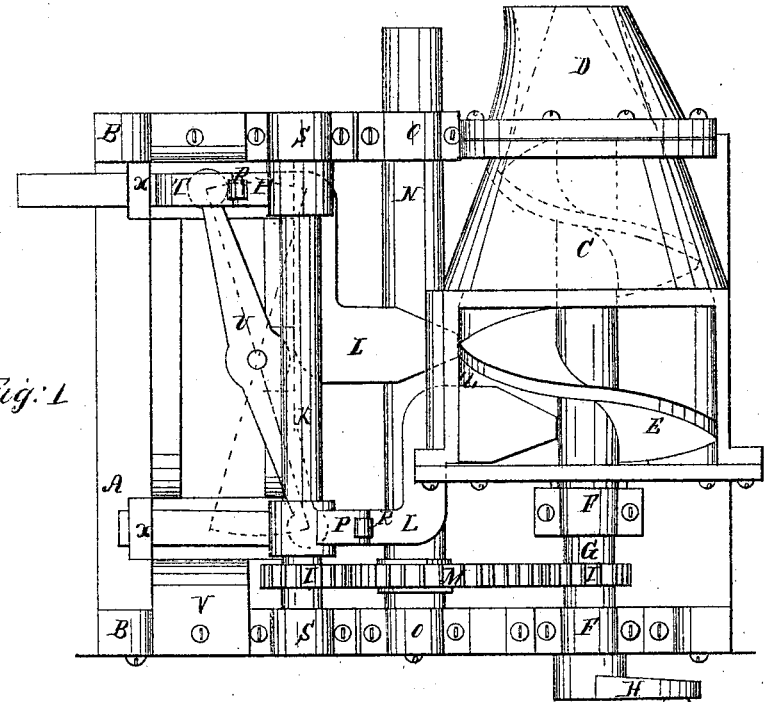
Figure 3:
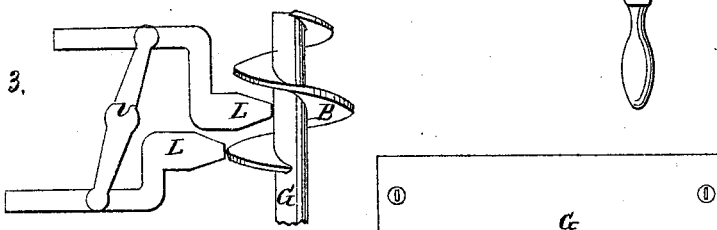
Figure 2:
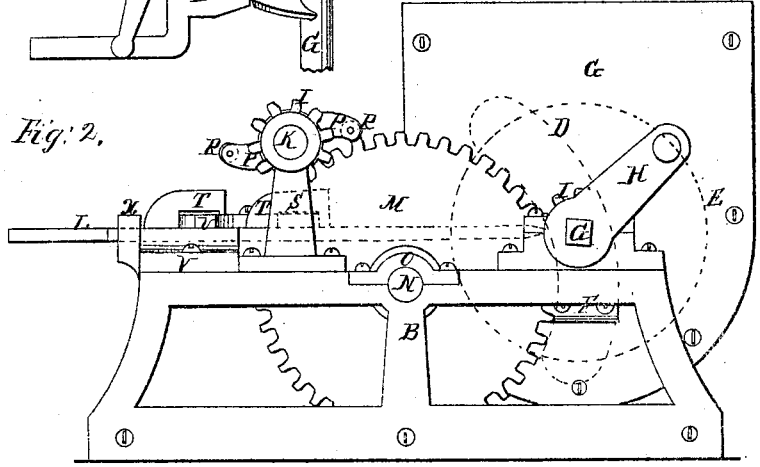

Figure 1 is a plan view, Fig. 2 an end view and Fig. 3 a detail view of screw and arresting plungers.

The nature of my invention consists in certain improvements in pug mills hereinafter more fully described.

The material for constructing this machine is cast and wrought iron in which A forms the base to which the side frames B B are firmly secured.

C is a cylindrical shaped hopper tapered from center toward discharge end with square opening on top to receive the clay.

D is a circular tapering discharge chamber secured to the end of hopper C by means of screws or bolts and may be constructed in any shape to suit different machines. Screw E is fitted to hopper C also tapering from center toward discharge end and is supported on bearings F F. The power is applied to screw shaft G either by any suitable gearing or band wheel or crank H. The gear wheels I I on screw shaft G and plunger shaft K are alike in size in order to create a uniform motion with resisting plungers L L and screw E. M is an intermediate gear wheel secured to main shaft N supported on side frames B B by means of bearings O O. To this shaft the brick machine or presses are attached. Motion is applied to resisting plungers by means of arms P P which are furnished with rollers R R in the end secured to shaft K which is supported on frames B B by means of bearings S S. The resisting plungers are provided with brackets T T which form pockets to receive the ends of vibrating beam U supported on frame work V which forms guides for the plungers and is secured to frame B B. The arms P P on shaft K are set opposite each other and in revolving catch on ends of brackets T T which withdraws one plunger and one end of the vibrating beam U and forces the other into the hopper while one is withdrawn the thread of screw passes the point Z and the other plunger enters.

X X are caps secured to frame work V through which the plungers move and keep them in proper place. The prepared clay is thrown into the top of hopper and is taken around with the screw to the plungers which arrest the clay of its further tendency to revolve with the screw and in connection with the screw causes the clay to be forced out through the tapered chamber to the circular orifice into the molds or press. The resisting plungers operate in such a manner that one thereof is continually within the hopper and forms a vacant space between the thread of the screw for receiving the clay.

Thus it will be seen that the plunger (which is within the hopper and between the thread of the screw), that as the thread of the screw is approaching said plunger when in motion and just before they come in contact said plunger is withdrawn and the other plunger is introduced on the other side of the thread, the action of the two plungers being simultaneous. The clay is thus prevented from adhering to the thread of the screw and caused to pass off regularly through the discharge opening.

I am aware that screws of different kinds have been used for tempering and carrying clay into brick machines. I therefore do not claim the screw separately, but What I do claim and desire to secure by Letters Patent is—

The arresting plungers or their equivalent in combination with the screw, the whole being constructed and arranged for operation in the manner and for the purpose set forth.

JAMES A. HAMER.

Witnesses:
G. S. KINSEY,
MATTHIAS MENGEL.